(12) United States Patent
Perini

(10) Patent No.: US 9,783,000 B2
(45) Date of Patent: Oct. 10, 2017

(54) WHEEL HUB FOR VEHICLE AXLE

(71) Applicant: RANDON S/A IMPLEMENTOS E PARTICIPACOES, Caxias do Sul-RS (BR)

(72) Inventor: Gustavo Perini, Farroupilha-RS (BR)

(73) Assignee: RANDON S/A IMPLEMENTOS E PARTICIPACOES, Caxias do Sul, RS (BR)

( * ) Notice: Subject to any disclaimer, the term of this patent is extended or adjusted under 35 U.S.C. 154(b) by 83 days.

(21) Appl. No.: 14/326,286

(22) Filed: Jul. 8, 2014

(65) Prior Publication Data

US 2015/0015058 A1   Jan. 15, 2015

(30) Foreign Application Priority Data

Jul. 9, 2013 (BR) .............................. 102013017572

(51) Int. Cl.
  *B60B 27/06* (2006.01)
  *B60B 27/00* (2006.01)

(52) U.S. Cl.
  CPC .............. *B60B 27/06* (2013.01); *B60B 27/00* (2013.01); *B60B 2900/30* (2013.01); *B60B 2900/313* (2013.01); *B60B 2900/513* (2013.01); *B60Y 2200/14* (2013.01); *Y02T 10/86* (2013.01)

(58) Field of Classification Search
  CPC ... B60B 27/00; B60B 27/06; B60B 2900/513; B60B 2900/313; B60B 2900/30; B60B 3/16; B60Y 220/14
  USPC ..................................................... 301/105.1
  See application file for complete search history.

(56) References Cited

U.S. PATENT DOCUMENTS

| | | | | |
|---|---|---|---|---|
| 975,453 | A * | 11/1910 | Perrins ...................... | B60B 3/16 301/105.1 |
| 985,711 | A * | 2/1911 | Sparks ................ | F16H 57/0415 301/105.1 |
| 2,272,889 | A * | 2/1942 | Brink ...................... | B60B 23/12 301/24 |
| 2,781,231 | A * | 2/1957 | Black ...................... | B60B 27/02 29/894.361 |
| 3,840,273 | A * | 10/1974 | Johns ...................... | B60B 11/02 301/35.628 |
| D274,716 | S * | 7/1984 | Mahnig ........................ | D12/207 |
| 5,921,633 | A * | 7/1999 | Neibling ............. | B60B 27/0005 188/18 A |
| 6,039,407 | A * | 3/2000 | Wiacek ................... | B60B 27/00 301/105.1 |
| 6,340,210 | B1 * | 1/2002 | Handa ..................... | B60B 3/002 301/64.303 |
| 6,899,400 | B1 * | 5/2005 | Cook ....................... | B60B 7/20 301/37.25 |
| 7,111,911 | B2 * | 9/2006 | Baumgartner ........ | F16D 65/123 188/218 XL |

(Continued)

*Primary Examiner* — J. Allen Shriver, II
*Assistant Examiner* — Brian Cassidy
(74) *Attorney, Agent, or Firm* — Amster, Rothstein & Ebenstein LLP

(57) ABSTRACT

The present invention relates to a wheel hub for vehicle axle used in trucks, buses, trailers and semi-trailers, consists of a cylindrical central body, said central body surrounded by a plurality of radial projections extending vertically from the median region of said central body, being structured by ribs integrated with said projections providing robustness, reduced weight and reduced heat transfer from the brake to tires.

2 Claims, 3 Drawing Sheets

(56) References Cited

U.S. PATENT DOCUMENTS

| | | | | |
|---|---|---|---|---|
| 7,393,064 B2* | 7/2008 | Hall | ................ | B60B 27/00 29/527.6 |
| 7,416,261 B2* | 8/2008 | Darnell | ................ | B60B 27/00 301/111.03 |
| 7,607,837 B2* | 10/2009 | Niebling | ................ | B60B 27/00 301/105.1 |
| 7,631,948 B2* | 12/2009 | Hofmann | ................ | B60B 27/00 301/105.1 |
| 7,661,766 B2* | 2/2010 | Davis | ................ | B60B 7/0066 301/37.108 |
| 7,871,134 B2* | 1/2011 | Hofmann | ................ | B60B 27/00 301/105.1 |
| 8,287,052 B2* | 10/2012 | Fakhoury | ................ | B60B 27/0057 301/105.1 |
| 8,292,046 B2* | 10/2012 | Masoni | ................ | B60B 27/00 188/18 A |
| 8,567,873 B2* | 10/2013 | Rider | ................ | B60B 1/08 301/105.1 |
| 8,950,824 B2* | 2/2015 | Eck | ................ | F16B 39/24 301/111.03 |
| 9,333,800 B2* | 5/2016 | Wiechmann | ................ | B60B 27/0047 |
| 2008/0303339 A1* | 12/2008 | Niebling | ................ | B60B 27/00 301/106 |
| 2011/0127826 A1* | 6/2011 | Krabill | ................ | B60B 27/00 301/6.8 |

\* cited by examiner

State of the Art

State of the Art

WHEEL HUB FOR VEHICLE AXLE

The present invention relates to a wheel hub for vehicle axle used in trucks, trailers and semi-trailers, said wheel hub consisting of a central body surrounded by a plurality of radial projections provided with orifices at one end to insert the bolts that will secure the wheels, said projections having ribs on both sides to provide a structure to the most demanded regions of the wheel, resulting in robustness and mass reduction.

In the new wheel hub for vehicle axle of this invention the projections have the shape of spokes, said spokes being distributed throughout the housing orifices of the wheel bolts, forming, among one another, radially-open regions, said regions extending until they find the central body of the hub, having said open regions the aim of improving ventilation and dissipating the heat internally generated in the brake.

BACKGROUND OF THE INVENTION

Current vehicle axles for trucks, buses, trailers and semi-trailers use basically two types of hubs, being either for disc wheels or for wheel rims.

The hubs used with wheel rims are mostly spoke and have different constructive forms, wherein the rim is attached to the ends of the hub spokes by means of clamps secured by bolts. There are also other cases in which a disc hub and a spoke adapter are used.

The hubs used with disc wheels are usually made up of a central body and a flange, wherein the wheels and brake drums are attached to by means of bolts.

The description above may be better understood through patent document P10204591-5.

The wheel hubs for disc wheels of the state of the art have large concentrations of mass in the region where the wheel bolts and brake drums are housed, since their construction shape is that of a flange, as illustrated in FIGS. 5 and 6.

The wheel hubs are also linked to either disc or drum brake systems, wherein part of the heat produced by the brake during braking is transmitted to the hub and to the wheels, especially in freight vehicles where heat generation on the axes is relatively high.

Among the drawbacks found in disc wheel hubs for the vehicle axle of the state of the art, we highlight, as the most relevant, low efficiency in dissipating heat, causing overheating in the hubs, wheels and tires, the most adverse consequence of it being suffered on components with low resistance to temperature, as in the case of tires, grease, bearings and retainers.

Another drawback found in this type of hub is its high weight, requiring over-sizing of the other axle components and vehicle suspension, in addition to resulting in a higher weight of the vehicle itself and, consequently lower cargo.

A solution to overcome part of this problem has been found by reducing the mass of the wheel hub, thereby reducing its weight and manufacturing cost of the product as a whole.

The document U.S. Pat. No. 7,111,911 B2 describes a wheel hub, especially a wheel hub for commercial vehicles, for receiving a brake disk, in which a neck section which is formed on the wheel flange for receiving the brake disk, the neck section being provided with a surface structure, preferably ribs, which increases the amount of the heat given off the environment. There may also be provided ducts between the ribs to permit cooling air to pass between the wheel flange and the brake disk to further increase the amount of heat given off to the environment.

The drawback in the above wheel hub is the fact that it has been designed specifically to be used with a certain type of disc brake, thus not offering a solution for use with drum brake.

The document U.S. Pat. No. 6,866,345 describes a wheel hub comprising a cylindrical main body, a radial flange and a plurality of radial ribs. The main body has an outboard end and an inboard end, and the radial flange has an outboard side and an inboard side. The radial flange is connected to and encircles the main body, with the radial ribs extending between the outboard side of the radial flange and the outboard end of said main body. In addition, the profile of the inboard side of said radial flange is a smooth, continuous curve.

The objective described in this document is to provide a wheel hub with increased resistance to compressive forces, reduced in weight as compared with the traditional wheel hub configuration, and, in addition, provide a sturdy wheel hub that is resistant to deformations in the central orifice of the main body, said deformations being caused by the efforts made by the axle.

The drawback in said invention is that it does not avoid overheating in the wheel hub, since there is no a free area for heat dissipating in the brake (since the flange region is fully closed), compromising prematurely the lifetime of bearings, seals and other components that are low resistant to high temperatures.

There is, therefore, the need to provide a new wheel hub for vehicle axle, said wheel hub being reduced in mass, thereby contributing to reducing the weight and the costs of the suspension components, vehicle and cargo being transported.

This new wheel hub will also improve the heat dissipation caused by the application of the brakes, since there will be a larger free area that will provide improved ventilation.

SUMMARY OF THE INVENTION

The main objective of this invention is to design a wheel hub for vehicle axle, said axle containing radial projections located in the regions of the wheel bolts, said regions having ribs aimed at providing a structure to the most demanded areas of the hub, thereby providing robustness and mass reduction.

Another objective is to improve ventilation and the dissipation of the heat generated by the application of the vehicle brakes.

Also another goal is to reduce the axle mass so as to improve the dynamic behavior of the suspension and vehicle.

DETAILED DESCRIPTION OF THE INVENTION

Figure 1:
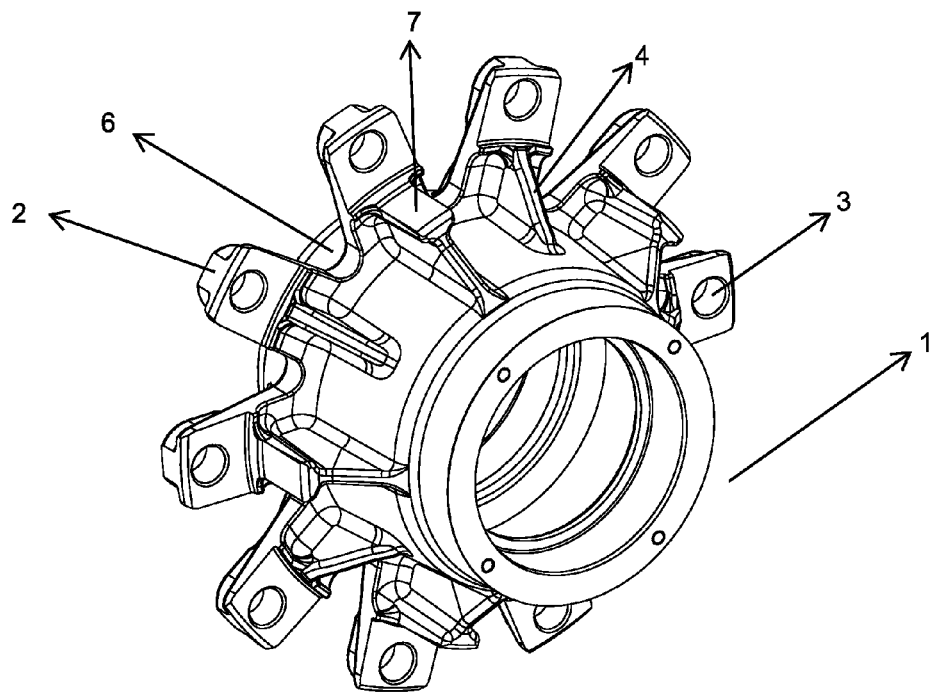
FIG. 1—Is a perspective view of the outboard side of the wheel hub for vehicle axle, of the present invention.
Figure 2:
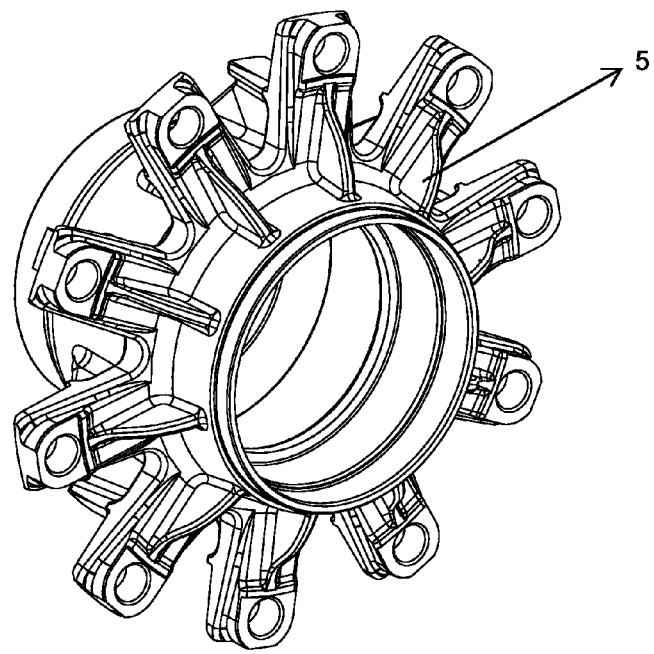
FIG. 2—Is a perspective view of the inboard side of the wheel hub shown in FIG. 1, of the present invention.
Figure 3:
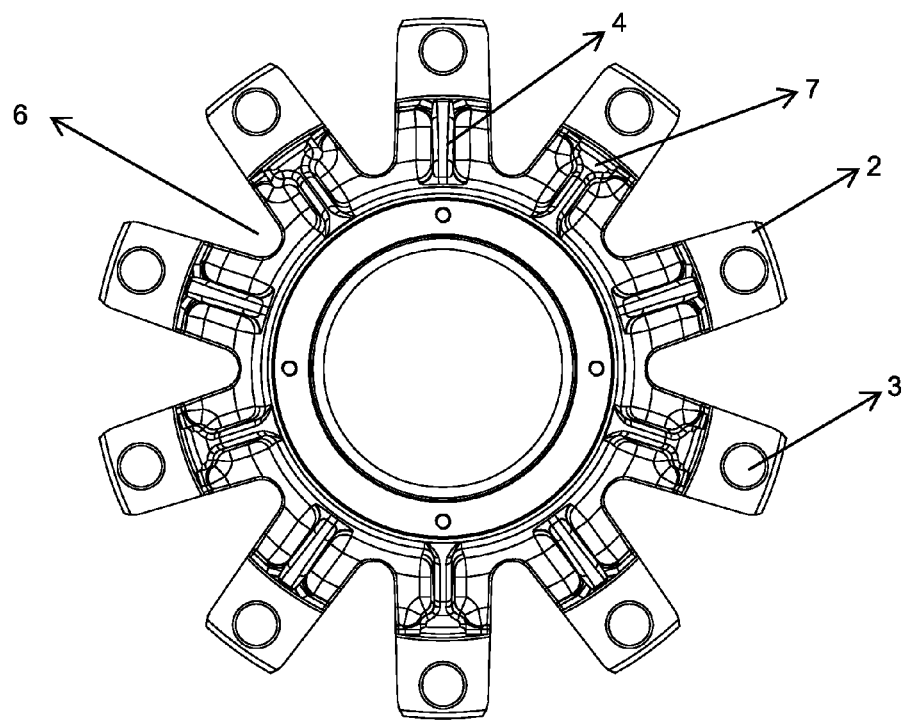
FIG. 3—Is a view of the outboard side of the wheel hub shown in FIG. 1, of the present invention.
Figure 4:
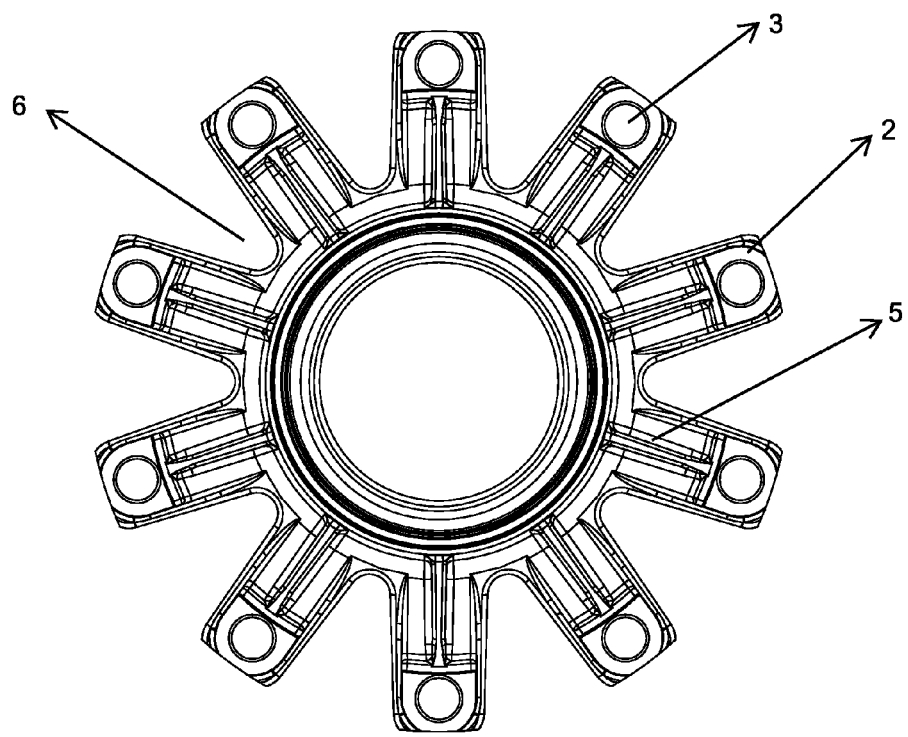
FIG. 4—Is a view of the inboard side of the wheel hub shown in FIG. 1, of the present invention.
Figure 5:
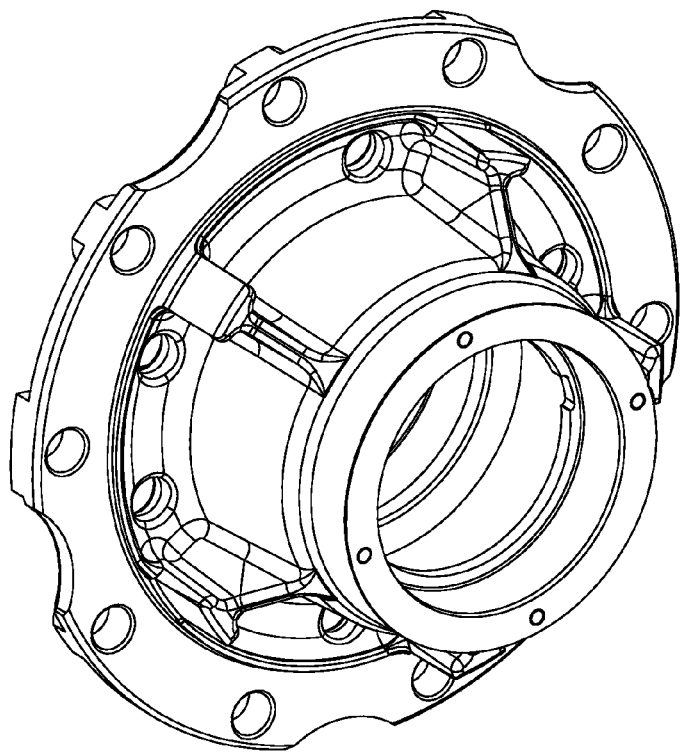
FIG. 5—Is a perspective view of the outboard side of a prior art wheel hub.
Figure 6:
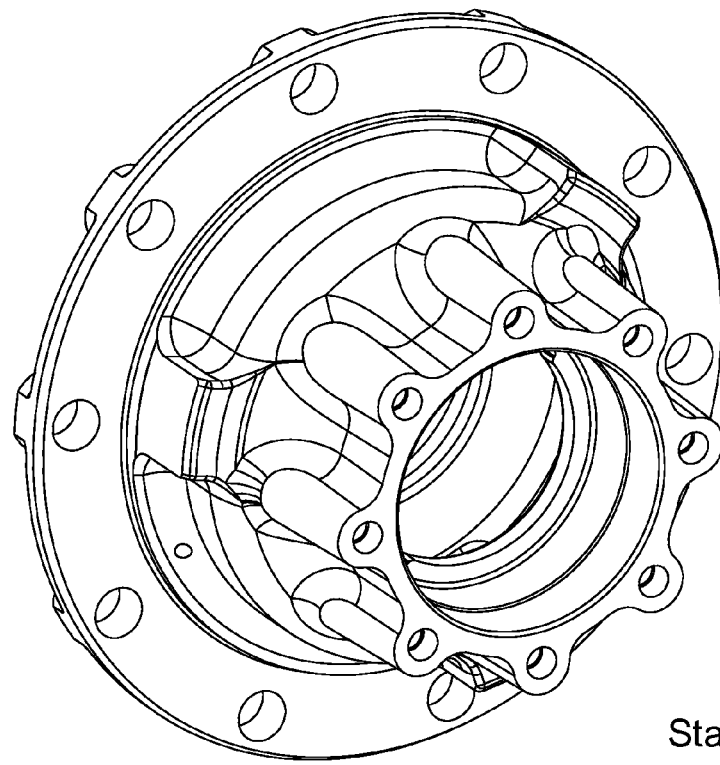
FIG. 6—Is a perspective view of the outboard side of another wheel hub of the prior art.

In conformity with the enclosed illustrated figures, this invention of a WHEEL HUB FOR VEHICLE AXLE, used in trucks, buses, trailers and semi-trailers, consists of a cylindrical central body (1), said central body housing the bearings and surrounded by a plurality of radial projections (2) that extend vertically from the median region of said central body (1), each one of said projections (2) being provided with an orifice (3) at the end, structured by ribs (4, 5), respectively integrated into said projections (2).

The radial projections (2) are spoke-shaped and are distributed into the orifices (3), with wheel bolts being housed into said orifices, forming, among one another, regions (6), said regions being radial openings and extending to the central body of the hub, or close to the central body (1). Said regions are aimed at improving ventilation and the dissipation of the heat internally generated by the brake, thus preventing heat from spreading to the tires and axle components.

Additionally, at least three ribs (4) are provided with guides (7) to aid fitting the vehicle wheels into the wheel hubs.

The ribs (4, 5) distributed on both sides of each radial projection (2) form a structural assembly that is intended to structure the most demanded regions of the hub, this way providing robustness, reduced mass and also helping dissipate the heat generated by the brakes, since the area for heat transmission is increased.

Additionally, the regions (6) may contain dirt containment devices, since certain applications may require the need to restrict the passage of these elements in both directions.

In practice, the wheel hub for vehicle axle provides significant reduction in weight and increased robustness due to the improved distribution of mass to the most demanded regions, in addition to reducing heat transfer to the tires, also contributing, as a result, to improve the dynamic behavior/performance of the vehicle by reducing the weight of the axle, suspension and the vehicle as a whole.

It will be easily understood by those skilled in the art that modifications can be carried out in this invention without departing from the principles exposed in the previous description. These modifications should be considered as included within the scope of the invention. As a result, the particular achievements described above, in detail, are only illustrative and non-restrictive as to the scope of the invention, to which it should be given the full extent of the enclosed claims, and of any and all equivalents thereof.

The invention claimed is:

1. A wheel hub for vehicle axle, comprising:
   a cylindrical central body comprising a longitudinal axis, a first lateral end and a second lateral end;
   a plurality of radial projections that surround the cylindrical central body and that vertically extend from a median region of the cylindrical central body;
   radial openings formed by the plurality of radial projections so that open passages are formed between the plurality of radial projections that extend from the first lateral end to the second lateral end of the cylindrical central body;
   an orifice disposed at an end portion of each of the plurality of radial projections; and
   ribs respectively integrated into the plurality of radial projections, at least three of the ribs equipped with guides for wheels, each rib formed by a radial protrusion with a lateral dimension that extends from a corresponding one of the radial projections in a direction parallel to the longitudinal axis, a width of each rib being substantially constant along the lateral dimension and less than a width of a corresponding radial projection, the ribs beginning from the median region of the cylindrical central body and extending vertically up to the guides.

2. A wheel hub for vehicle axle, according to claim 1, wherein the at least three of the ribs extend axially beyond other ones of the ribs.

* * * * *